US 9,885,245 B2

(12) United States Patent
Crosatti et al.

(10) Patent No.: US 9,885,245 B2
(45) Date of Patent: Feb. 6, 2018

(54) TURBINE NOZZLES AND COOLING SYSTEMS FOR COOLING SLIP JOINTS THEREIN

(71) Applicant: HONEYWELL INTERNATIONAL INC., Morristown, NJ (US)

(72) Inventors: Lorenzo Crosatti, Phoenix, AZ (US); Ardeshir Riahi, Scottsdale, AZ (US); Bradley Reed Tucker, Chandler, AZ (US); Shezan Kanjiyani, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 709 days.

(21) Appl. No.: 14/283,104

(22) Filed: May 20, 2014

(65) Prior Publication Data

US 2015/0337680 A1  Nov. 26, 2015

(51) Int. Cl.
*F01D 9/02* (2006.01)
*F01D 9/04* (2006.01)
(Continued)

(52) U.S. Cl.
CPC .......... *F01D 9/02* (2013.01); *F01D 9/04* (2013.01); *F01D 9/042* (2013.01); *F01D 9/065* (2013.01);
(Continued)

(58) Field of Classification Search
CPC ..... F01D 5/22; F01D 5/18; F01D 5/14; F01D 5/145; F01D 5/186; F01D 9/042;
(Continued)

(56) References Cited

U.S. PATENT DOCUMENTS

| 3,824,030 A | 7/1974 | DeFeo |
| 4,137,619 A | 2/1979 | Beltran et al. |

(Continued)

FOREIGN PATENT DOCUMENTS

| DE | 10346240 A1 | 4/2005 |
| EP | 2415969 A1 | 2/2012 |

(Continued)

OTHER PUBLICATIONS

EP Extended Search Report for Application No. EP 14185022.2 dated Apr. 9, 2015.

(Continued)

*Primary Examiner* — Ninh H Nguyen
*Assistant Examiner* — Brian P Wolcott
(74) *Attorney, Agent, or Firm* — Lorenz & Kopf, LLP (57) ABSTRACT

Turbine nozzles and cooling systems for cooling slip joints therein are provided. The turbine nozzle has an endwall, a vane coupled to the endwall, a slip joint, and a plurality of airfoil quenching holes that cooperate with a plurality of endwall cooling holes. The vane comprises a leading edge and a trailing edge interconnected by a pressure sidewall and a suction sidewall and an end portion. The slip joint is between the end portion and the endwall. The airfoil quenching holes are defined through the pressure sidewall in the end portion. The endwall cooling holes are defined through the endwall along the pressure sidewall and in proximity to the leading edge. The airfoil quenching holes and endwall cooling holes are disposed adjacent the slip joint.

18 Claims, 6 Drawing Sheets

(51) Int. Cl.
*F01D 9/06* (2006.01)
*F01D 25/12* (2006.01)
*F01D 25/24* (2006.01)

(52) U.S. Cl.
CPC .......... *F01D 25/12* (2013.01); *F01D 25/246* (2013.01); *F05D 2220/32* (2013.01); *F05D 2240/81* (2013.01); *F05D 2260/201* (2013.01); *F05D 2260/202* (2013.01); *Y02T 50/673* (2013.01); *Y02T 50/676* (2013.01)

(58) Field of Classification Search
CPC ........ F01D 9/041; F01D 25/12; F01D 25/246; F01D 9/04
See application file for complete search history.

(56) References Cited

U.S. PATENT DOCUMENTS

| | | | |
|---|---|---|---|
| 4,283,822 A | | 8/1981 | Muth et al. |
| 4,728,258 A | | 3/1988 | Biazek et al. |
| 4,863,348 A | * | 9/1989 | Weinhold ................ F01D 5/145 415/115 |
| 5,069,265 A | * | 12/1991 | Blazek ..................... B22C 9/04 164/10 |
| 5,630,700 A | | 5/1997 | Olsen |
| 5,785,492 A | | 7/1998 | Belsom et al. |
| 6,354,797 B1 | | 3/2002 | Heyward et al. |
| 6,616,405 B2 | * | 9/2003 | Torii ....................... F01D 5/186 415/914 |
| 7,004,720 B2 | | 2/2006 | Synnott et al. |
| 7,097,417 B2 | * | 8/2006 | Liang ..................... F01D 5/145 415/115 |
| 7,204,019 B2 | | 4/2007 | Ducotey, Jr. et al. |
| 7,249,933 B2 | | 7/2007 | Lee et al. |
| 7,621,718 B1 | | 11/2009 | Liang |
| 7,832,986 B2 | | 11/2010 | Baker et al. |
| 8,047,771 B2 | | 11/2011 | Tucker et al. |
| 8,070,422 B1 | | 12/2011 | Liang |
| 8,113,779 B1 | | 2/2012 | Liang |
| 8,215,900 B2 | | 7/2012 | Morrison |
| 8,459,935 B1 | | 6/2013 | Liang |
| 2005/0175444 A1 | | 8/2005 | Liang |
| 2008/0050223 A1 | | 2/2008 | Liang |
| 2008/0085190 A1 | | 4/2008 | Liang |
| 2010/0054930 A1 | | 3/2010 | Morrison |
| 2011/0243724 A1 | | 10/2011 | Campbell et al. |
| 2011/0299999 A1 | | 12/2011 | James |
| 2015/0198048 A1 | * | 7/2015 | Handler ................. F01D 5/147 416/95 |

FOREIGN PATENT DOCUMENTS

| | | | |
|---|---|---|---|
| EP | 2881542 A1 | 10/2015 | |
| WO | 2014016149 A1 | 1/2014 | |

OTHER PUBLICATIONS

EP Extended Search Report for Application No. EP 15158094.1-1610 dated Oct. 27, 2015.
USPTO Office Action for U.S. Appl. No. 14/099,289 dated Jun. 8, 2016.
Nicholls, J.R.; Advances in Coating Design for High-Performance Gas Turbines; MRS Bulletin, vol. 28, Issue 09, Sep. 2003, pp. 659-670; Materials Research Society 2003. [Retrieved from Internet on Oct. 8, 2013; URL: http://journals.cambridge.org/action/displayAbstract?fromPage=online&aid=7965505.].
Asthana, R., et al.; Casting and Solidification; Acedemic Press Materials Processing and Manufacturing Science, 2006, pp. 57-165. [Retrieved from Internet on Oct. 8, 2013; URL: http://www.sciencedirect.com/science/article/pii/B9780750677165500042].
Riahi et al. Bi-Cast Turbine Nozzles and Methods for Cooling Slip Joints Therein; U.S. Appl. No. 14/099,289, filed Dec. 6, 2013.
Rolls Royce; Turbines; Retrieved from Internet [http://www.rolls-royce.com/about/technology/gas_turbine_tech/turbines.jsp] Mar. 12, 2014.
USPTO Office Action for U.S. Appl. No. 14/099,289 dated Dec. 12, 2016.
EP Examination Report for Application No. 15158094.1-1610 dated Mar. 2, 2017.
USPTO Office Action for U.S. Appl. No. 14/099,289 dated Jun. 29, 2017.

* cited by examiner

TURBINE NOZZLES AND COOLING SYSTEMS FOR COOLING SLIP JOINTS THEREIN

STATEMENT REGARDING FEDERALLY SPONSORED RESEARCH OR DEVELOPMENT

This invention was made with Government support under W911W6-08-2-0001 awarded by the U.S. Army. The Government has certain rights in this invention.

TECHNICAL FIELD

The present invention generally relates to gas turbine engines, and more particularly relates to turbine nozzles and cooling systems for cooling slip joints therein.

BACKGROUND

Gas turbine engines are generally known in the art and used in a wide range of applications, such as propulsion engines and auxiliary power unit engines for aircraft. In a typical configuration, a turbine section of the gas turbine engine includes a turbine nozzle. A turbine nozzle comprises an annular array of stationary airfoils (also referred to herein as "vanes") that extend between annular endwalls. In the gas turbine engine, hot combustion gases from a combustion section are directed against the annular array of vanes. When the vanes are heated faster and are hotter than the endwalls, the vanes become susceptible to large thermal compressive stresses because the vanes tend to expand but are constrained by the endwalls. Therefore, one approach to prevent these compressive stresses in a conventional turbine nozzle is to include a slip joint and associated space between an end portion of each vane in the annular array and the adjacent endwall to accommodate thermal expansion of the vanes. The opposing end portion of each vane is mechanically anchored into an opposing endwall. The slip joint, when in an open condition, forms a gap along a pressure sidewall of the vane (hereinafter a "pressure side gap") and an opposing gap along a suction sidewall of the vane.

While the slip joint between the end portion of each of the vanes and the adjacent endwall in the turbine nozzle is generally provided to accommodate thermal expansion of the vanes, the slip joints can undesirably allow for hot combustion gas ingestion from the pressure side of the vanes, into the associated space, and onto the suction side of the vanes. Such hot combustion gas ingestion can result in aerodynamic performance degradation and oxidation damage to the vanes and adjacent endwall at the slip joints, causing material recession of the vanes and adjacent endwall. As the size of the gaps between the end portion of the vanes and adjacent endwall at the slip joint increases due to material recession, the amount of hot gas ingestion increases, resulting in still higher aerodynamic performance degradation and even more oxidation damage, continuing to cause even more recession.

Film cooling of vanes is a widely used technique that helps to maintain vane material temperatures within acceptable limits. With film cooling of vanes, air is extracted from a compressor section of the gas turbine engine and forced through internal cooling passages within the vanes before being ejected through a showerhead or other film cooling holes in the vane onto the outer wall surface of the vane. The cooling medium ejected from these film cooling holes forms a film layer of cooling medium on the outer wall surface to protect the vane from the hot combustion gas by substantially reducing heat transfer from the hot combustion gas to the vane skin as the cooling medium is at a lower temperature than the hot combustion gas. Film cooling of endwalls is also known. Cooling film blow-off (i.e., separation of the cooling film layer from the vane and/or endwall outer wall surface) may, however, substantially impede formation of the film layer of cooling medium against the outer wall surface, resulting in lower overall vane/endwall cooling effectiveness. In addition, neither vane film cooling nor endwall film cooling sufficiently cool the slip joint of the turbine nozzle to avoid the aerodynamic performance degradation and oxidation damage that are caused by the hot gas ingestion through the slip joints and through the associated space in the endwall.

Hence, there is a need to substantially prevent oxidation damage caused by hot gas ingestion at the slip joints of turbine nozzles, to thereby maintain aerodynamic performance and operative life of the turbine nozzle. It is also needed to mitigate cooling film blow-off, thereby resulting in higher overall cooling effectiveness. Furthermore, other desirable features and characteristics of the present invention will become apparent from the subsequent detailed description of the present invention and the appended claims, taken in conjunction with the accompanying drawings and this background of the invention.

BRIEF SUMMARY

Turbine nozzles are provided. In accordance with one exemplary embodiment, the turbine nozzle comprises an endwall, a vane coupled to the endwall, a slip joint, and a plurality of airfoil quenching holes cooperating with a plurality of endwall cooling holes. The vane comprises a leading edge and a trailing edge interconnected by a pressure sidewall and a suction sidewall and an end portion. The slip joint is between the end portion and the endwall. The airfoil quenching holes are defined through the pressure sidewall in the end portion. The endwall cooling holes are defined through the endwall along the pressure sidewall and in proximity to the leading edge. The plurality of airfoil quenching holes and endwall cooling holes are disposed adjacent the slip joint.

Turbine nozzles for a gas turbine engine are provided in accordance with yet another exemplary embodiment of the present invention. The turbine nozzle comprises a pair of endwalls, a plurality of vanes extending between the pair of endwalls, a slip joint, and a plurality of airfoil quenching holes cooperating with a plurality of endwall cooling holes to cool the slip joint. Each vane of the plurality of vanes comprises a leading edge and a trailing edge interconnected by a pressure sidewall and a suction sidewall and an end portion and an opposing end portion. The slip joint is between the end portion and an adjacent endwall of the pair of endwalls and the opposing end portion is anchored to the other endwall of the pair of endwalls. A plurality of airfoil quenching holes are defined through the pressure sidewall in the end portion and the plurality of endwall cooling are defined through the adjacent endwall along the pressure sidewall and in proximity to the leading edge. The plurality of airfoil quenching holes and endwall cooling holes are disposed adjacent the slip joint.

Cooling systems for cooling a slip joint in a turbine nozzle are provided in accordance with yet another exemplary embodiment of the present invention. The turbine nozzle comprises a vane having an end portion coupled to an endwall by the slip joint. The cooling system comprises a plurality of airfoil quenching holes defined in the end portion of the vane and a plurality of endwall cooling holes defined in the endwall. The plurality of endwall cooling holes cooperate with the plurality of airfoil quenching holes to cool the slip joint. The plurality of airfoil quenching holes and endwall cooling holes are disposed adjacent the slip joint, on a pressure side of the vane.

Furthermore, other desirable features and characteristics of the turbine nozzles and cooling systems for cooling slip joints therein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to turbine nozzles and cooling systems for cooling slip joints therein. The turbine nozzle comprises an annular array of stationary airfoils (i.e., vanes) extending between a pair of endwalls. Each vane has an end portion slip coupled by a slip joint to an endwall of the pair of endwalls. The slip joints accommodate differential thermal expansion between the vanes and the endwalls. Exemplary embodiments of the present invention as described herein result in significantly reducing the temperature at the slip joints and in improving overall cooling effectiveness so as to substantially prevent aerodynamic performance degradation and oxidation damage to the vanes and endwalls, thereby resulting in decreasing material recession thereof and contributing to longer operative life of the turbine nozzles. Cooling film blow-off at the endwall is also reduced.

Figure 1:
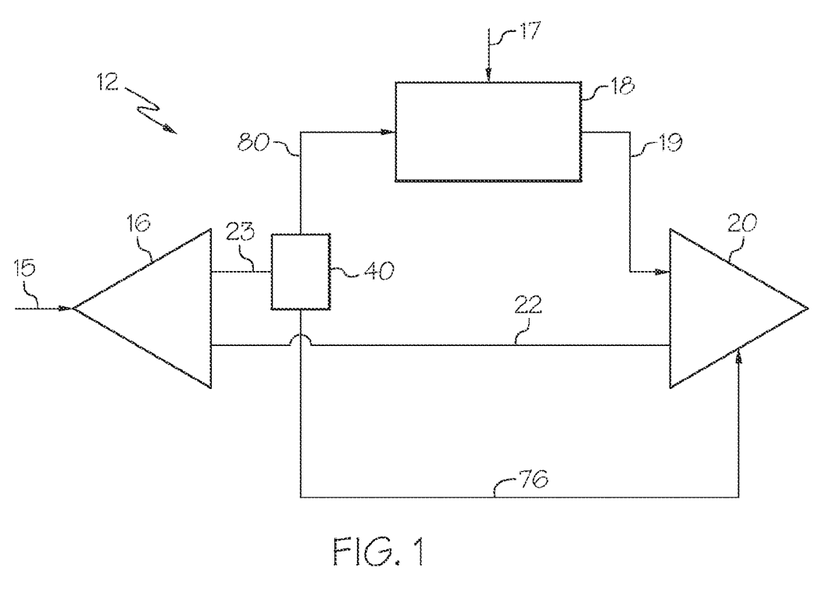
FIG. 1 is a simplified schematic illustration of an exemplary gas turbine engine.
Figure 2:
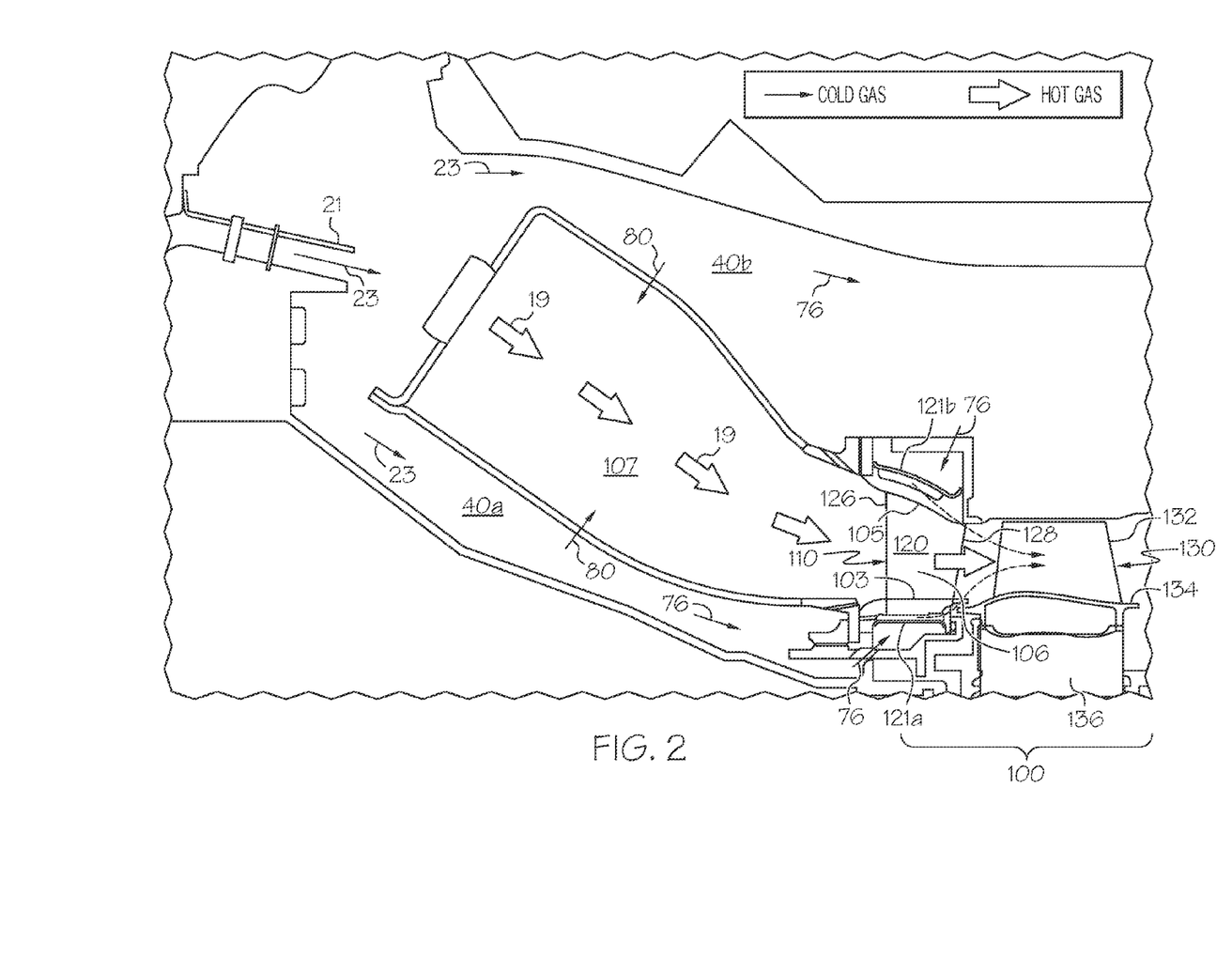
FIG. 2 is a partial cross-sectional view of an exemplary gas turbine engine.

FIG. 1 is a simplified schematic illustration of a gas turbine engine 12. The gas turbine engine 12 includes a compressor 16, a combustor 18, and a turbine 20. The compressor 16, combustor 18, and turbine 20 are in flow communication. Compressor 16 and turbine 20 are coupled by a shaft 22. Shaft 22 rotates about an axis of symmetry, which is the centerline of the shaft 22. In operation, air 15 flows into the compressor 16 and compressed air 23 exits the compressor 16 through a compressor exit 21 (FIG. 2) and flows into a combustor plenum 40. A portion 80 of the compressed air 23 flows from the combustor plenum 40 (more particularly, through an inner diameter combustor plenum 40a and an outer diameter combustor plenum 40b as depicted in FIG. 2) (the inner diameter combustor plenum 40a and the outer diameter combustor plenum referred to collectively in FIG. 1 as "combustor plenum 40") to combustor 18 and is then mixed with fuel 17 provided by fuel nozzles (not shown) and ignited within the combustor 18 to produce hot combustion gases 19. The hot combustion gases 19 drive turbine 20 in the gas turbine engine 12, as hereinafter described. The remaining portion (hereinafter "cooling medium" 76) of the compressed air 23 flows from the combustor plenum 40 (more particularly, inner diameter and outer diameter combustor plenums 40a and 40b (FIG. 2)), to the turbine 20 to cool the turbine components including the turbine nozzle 110 in a turbine section 100 (FIG. 2) of the gas turbine engine. The combustor plenum 40 is in flow communication with both the compressor 16 and turbine 20 (FIG. 1). More specifically, a portion of the cooling medium 76 flows from combustor plenum 40b to an airfoil cooling circuit 115 (FIG. 4), as hereinafter described. Another portion of cooling medium 76 flows from combustor plenum 40a to an endwall cooling circuit 117 (FIG. 4), as hereinafter described. It is to be understood that only one compressor and one turbine are shown for ease of illustration, but multiple compressors and turbines may be present in the gas turbine engine. It is also to be understood that while one exemplary configuration for cooling the slip joints in the turbine nozzle with cooling medium has been described, the cooling medium may be supplied to the turbine nozzle and slip joints therein using other configurations.

FIG. 2 is a fragmented partial cross sectional view of the gas turbine engine 12 of FIG. 1 including the high pressure turbine (HPT) section 100. In general terms, the turbine section 100 of FIG. 2 is comprised of at least one turbine nozzle 110 (e.g., FIG. 3) with stationary airfoils (vanes) 120 and at least one turbine rotor 130 with rotor blades 132 (rotating airfoils). The vanes of the turbine nozzle 110 extend between annular endwalls 103 and 105 that define a portion 106 (FIG. 5) of the mainstream hot combustion gas flow path 107 for receiving the flow of hot combustion gases 19 from the engine combustor 18. The rotor blades 132 of the turbine rotor 130 project radially outward from a turbine rotor platform 134 that is coupled to a turbine disk 136, which in turn circumscribes a shaft (not shown). During operation, the hot combustion gases 19 flow past the axially spaced circumferential rows of vanes 120 and rotor blades 132 to drive the rotor blades 132 and the associated turbine rotor 130 of the turbine 20 for power extraction. Other embodiments of the gas turbine engine 12 and turbine section 100 may be differently arranged. The gas turbine engine 12 and turbine section 100 thereof have an overall construction and operation that is conventional. The turbine nozzle may be fixedly mounted between the combustor and first stage rotor of the gas turbine engine 12. Although it is believed that the turbine nozzle 110 constructed in accordance with exemplary embodiments of the present invention will be particularly advantageous when used between the combustor and first stage rotor of a turbine engine, it should be understood that turbine nozzles constructed in accordance with the present invention can be used at other locations in a gas turbine engine.

Figure 3:
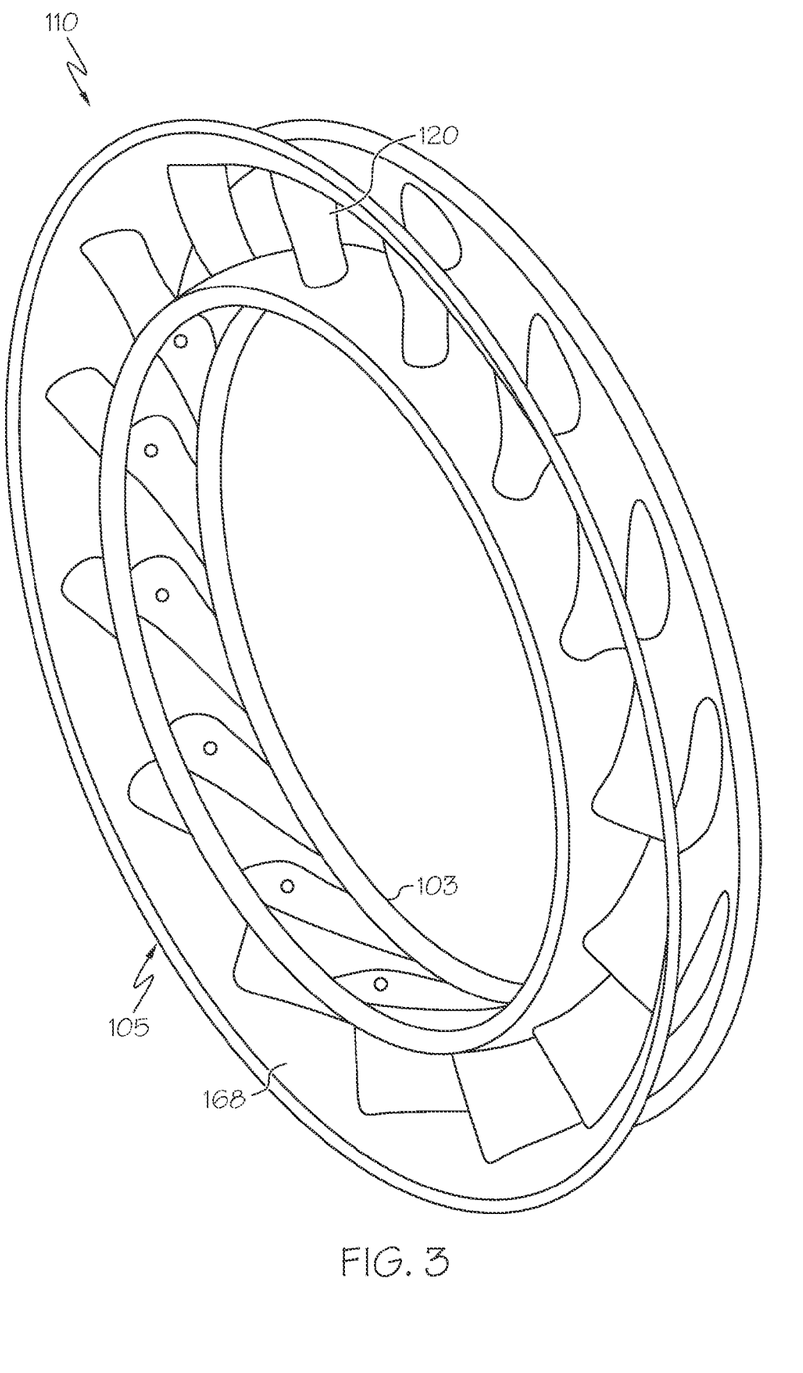
FIG. 3 is an isometric view of an exemplary turbine nozzle that may be used in the turbine section of FIG. 2.
Figure 4:
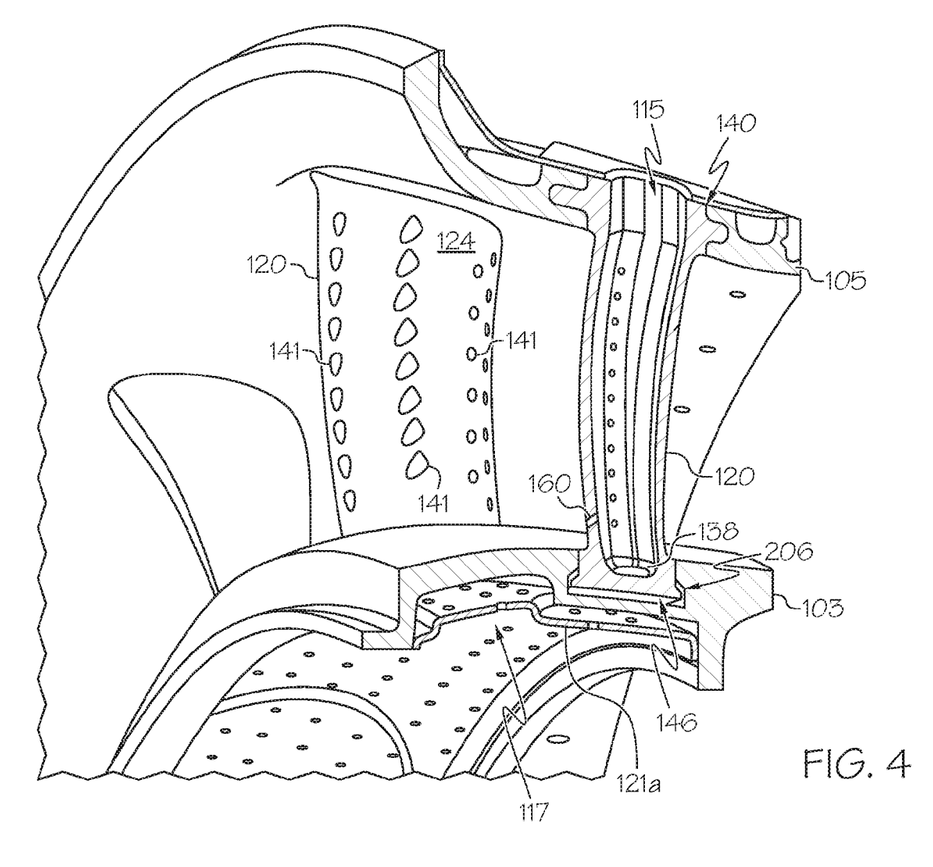
FIG. 4 is a schematic view of a suction side of a plurality of vanes in a portion of the turbine nozzle of FIG. 3.

FIG. 3 is an isometric view of the turbine nozzle 110 of FIG. 2, in accordance with exemplary embodiments of the present invention. FIG. 4 is a schematic view of a portion of the turbine nozzle 110 of FIG. 3. The turbine nozzle 110 comprises a plurality of vanes 120 arranged in an annular array between the pair of opposing endwalls 103 and 105. The endwalls 103 and 105 have a generally cylindrical main or body section 168 (FIG. 3). The endwalls 103 and 105 are positioned in a concentric relationship with the vanes 120 disposed in the radially extending annular array between the endwalls. The outer endwall 105 circumscribes the inner endwall 103 and is spaced therefrom to define the portion 106 of the combustion gas flow path 107 (FIG. 2) in the gas turbine engine. The plurality of vanes is configured to be disposed in the portion 106 of the combustion gas flow path 107. Each of the vanes 120 has a generally concave pressure sidewall 122 (FIGS. 5 and 6) and a generally convex suction sidewall 124 (FIGS. 4 and 5) opposed thereto. The sidewalls 122 and 124 interconnect a leading or upstream edge 126 and a trailing or downstream edge 128 (FIGS. 2 and 6) of each vane. Each vane comprises a pair of end portions. The pair of end portions comprises an inner end portion 138 and an opposing outer end portion 140. The inner end portion forms a slip joint with the (adjacent) inner endwall. The inner end portion is disposed in a space in the inner endwall and the outer end portion is anchored in the outer endwall as hereinafter described. As depicted in FIG. 4, the vanes further include a plurality of film cooling holes 141 extending in at least the span-wise direction as known in the art. While a specific number, shape, and arrangement of film cooling holes 141 are depicted in the suction sidewall of the vanes depicted in FIG. 4, it is to be understood that the number, shape, arrangement, etc. of film cooling holes extending in at least the span-wise direction are not limited to that depicted in FIG. 4. Moreover, there may be a plurality of film cooling holes in the pressure sidewall of the vane (the film cooling holes thereof are omitted for ease of illustration in FIG. 6).

In an embodiment, the turbine nozzle may be manufactured by a known bi-cast method in which the stationary airfoils (vanes) 120 are cast separately from the inner and outer endwalls 103 and 105. The endwalls may be respectively cast around the inner and outer end portions 138 and 140 of the prefabricated vanes 120. More particularly, the inner endwall 103 is cast around the inner end portion 138 of the vane and the outer endwall 105 is cast around the outer end portion 140 of the vane. An advantage to the bi-cast method is that the vanes 120 and endwalls 103 and 105 can each be formed from materials having different material compositions and crystallographic structures. For example, the vanes 120 in the bi-cast turbine nozzle may be formed of metal and/or ceramic materials that can withstand the extremely high operating gas temperatures (greater than about 2800° Fahrenheit) to which they are exposed in the gas turbine engine. For example, the vanes 120 may be cast as a single crystal of a nickel-alloy metal. The vanes may be cast by methods well known in the art. As the endwalls 103 and 105 are subjected to operating temperatures that differ somewhat from the operating temperatures to which the vanes 120 are subjected, the endwalls 103 and 105 can advantageously be made of materials which are different from the materials of the vanes as hereinafter described. For example, the inner and outer endwalls 103 and 105 may be formed of a nickel superalloy, such as MAR M247. Although the endwalls 103 and 105 are described as cast of the same metal, they could be formed of different metals, if desired. Therefore, it is to be understood that the inner endwall may be cast of one metal and the outer endwall cast of another metal. The vanes 120 may be formed of a third metal or ceramic material in order to optimize the operating characteristics of the bi-cast turbine nozzle. In another embodiment, the endwalls and vanes may comprise the same material. Alternatively, the turbine nozzle may be manufactured by brazing in which the stationary airfoils (vanes) 120 and endwalls are separately cast and then brazed together, as known in the art.

Figure 6:
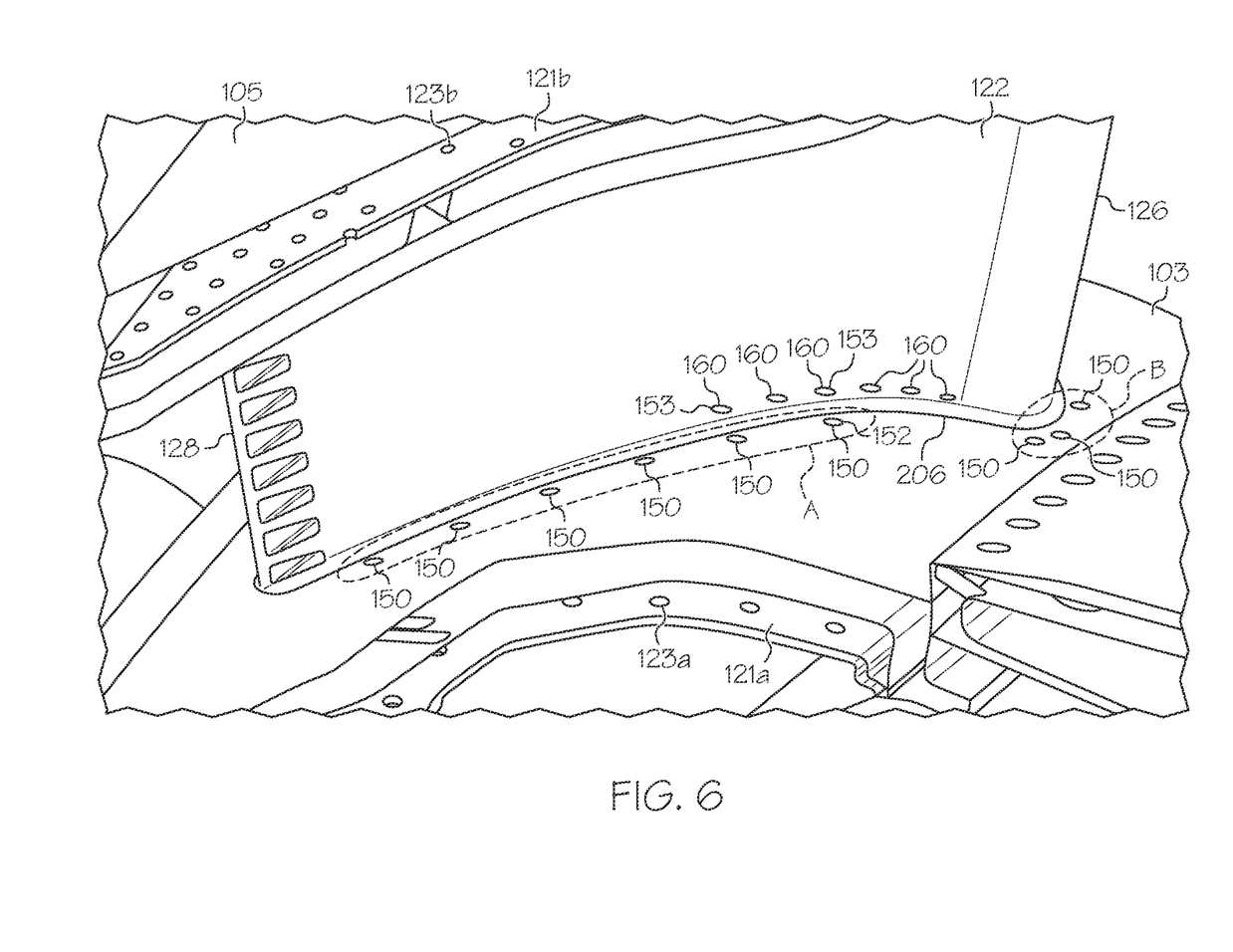
FIG. 6 is a schematic view of a pressure side of a portion of the turbine nozzle of FIGS. 3 and 4 and a portion of an inner diameter combustor plenum from which an endwall cooling circuit receives cooling medium that is directed to a plurality of endwall cooling holes and a portion of an outer diameter combustor plenum from which an airfoil cooling circuit receives cooling medium that is directed to a plurality of airfoil quenching holes, the endwall cooling holes and the airfoil quenching holes cooperating in a cooling system for cooling the slip joints (one of which is depicted in FIG. 5) in the operating turbine nozzle according to exemplary embodiments of the present invention.

Referring again specifically to FIG. 4, and as noted previously, the inner end portion 138 of the illustrated vane is slip coupled by the slip joint 206 with the adjacent inner endwall 103. It should be noted that the outer end portion 140 of the vane 120 is mechanically anchored in the outer endwall 105 by methods well known in the art. This arrangement prevents the vanes 120 from moving out of engagement with the opposing endwall as the vane moves within the conformity of the inner endwall at the slip joints. More particularly, the outer end portions of each of the vanes 120 are anchored in and held against axial and radial movement relative to the outer endwall. While the slip joints are illustrated in FIG. 4 as being between the inner endwall and the inner end portion of the vane, it is to be understood that the slip joints may be between the outer endwall and the outer end portions of the vanes if desired, using the inner endwall instead of the outer endwall as the mechanical anchor. An impingement baffle 121a is disposed exteriorly of endwall 103 and includes a plurality of openings 123a and impingement baffle 121b is disposed exteriorly of endwall 105 and includes a plurality of openings 123b (FIGS. 2 and 6). Impingement baffle 121a is used for impingement cooling of the inner endwall 103 whereas impingement baffle 121b is used for impingement cooling of the outer endwall 105 and is also an inlet to an aft portion of the airfoil cooling circuit 115.

Figure 5:
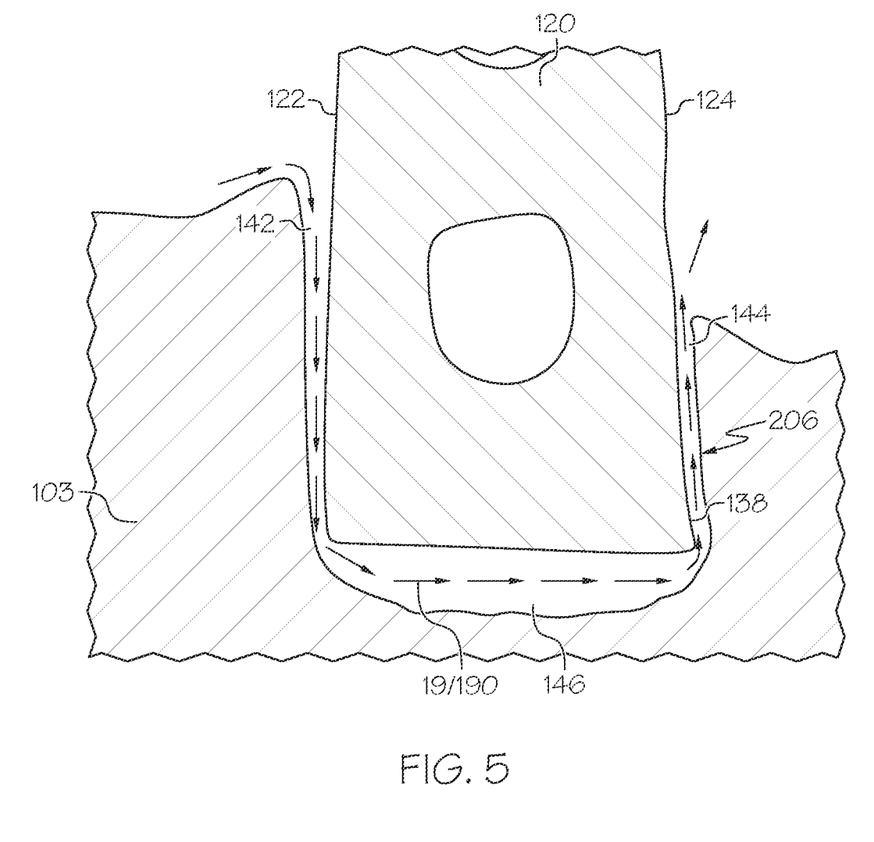
FIG. 5 is a schematic view of a slip joint between an exemplary inner endwall of the turbine nozzle of FIGS. 3 and 4 and an exemplary inner end portion of one of the vanes thereof, depicting hot combustion gas ingestion flow through the slip joint.

During operation of the gas turbine engine, as known in the art, the vanes 120 are exposed to hot combustion gas 19 (FIG. 1) that comes from the combustor 18 (FIG. 1). The hot combustion gas from the combustor is directed against the annular array of stationary airfoils (vanes) 120 that extend between the inner endwall and the outer endwall. FIG. 5 is a schematic view of the inner endwall slip joint portion of the turbine nozzle of FIG. 3, depicting the hot combustion gas ingestion flow (and alternatively, diluted and cooled combustion gas flow as hereinafter described) through the slip joint between the end portion of a single vane and the endwall (in this depiction, between the inner end portion and the inner endwall) and associated space 146 in the endwall, from the pressure side of the vane, under the vane footprint, and onto the suction side of the vane along the combustion gas flowpath. The hot combustion gas 19 is ingested into the slip joint 206 and flows along the portion 106 (FIG. 2) from a pressure side (FIG. 6) of the vane, into the associated space 146 in the endwall adjacent the vane end portion, and onto a suction side (FIG. 4) (the suction sidewall 124) of the vane because of the pressure being higher on the pressure side of the vane compared to the suction side of the vane. More particularly, the hot combustion gas 19 flows into the gap 142 between the pressure sidewall and the opposing surface of the adjacent endwall, through the space 146 underneath the vane footprint, and into the opposing gap 144 between the suction sidewall and the opposing surface of the adjacent endwall.

When the inner and outer endwalls 103 and 105 and vanes 120 are at ambient temperatures, the slip joints 206 are tightly closed. However, during engine transient operating conditions, the vanes 120 and inner and outer endwalls 103 and 105 may heat up or cool down at different rates and be at different temperatures, resulting in different levels of radial displacement for the vanes and endwalls. The vanes 120 may be allowed to become hotter than the inner and outer endwalls 103 and 105 because the vane material may be able to sustain higher temperatures than the endwall material, or because the vanes are exposed to a hotter combustion gas temperature than the endwalls. Also, under transient engine operation, the vane temperature will respond faster to combustion gas temperature changes (cool down or heat up) than endwalls, due to a difference in thermal inertia between the vanes and the endwalls. As such, the vane radial displacement may be different than the endwalls due to different temperature level and/or different coefficient of thermal expansions owing to different materials being used for vanes and endwalls. As this occurs, the vanes are free to move in the radial direction (relative to the inner endwall) through the slip joints, without resulting in compressive or tensile stress buildup. At the same time, the outer endwall may be at a different temperature than the inner endwall during transient operation, and as the outer endwall is at a different radial position than the inner endwall, the radial displacement of the outer endwall may be different from that of the inner endwall. As the vanes are mechanically anchored to the outer endwall (in the depicted embodiment), and accordingly move radially with the outer endwall, the vanes move relative to the inner endwall through the slip joints. This relative movement in the radial direction between the vanes and inner endwall results in opening the slip joints during engine operation. The slip joint 206 in the open condition as depicted in FIG. 5 comprises a gap 142 between the pressure sidewall 122 and the opposing surface of the adjacent endwall and an opposing gap 144 between the vane suction sidewall 124 and the opposing surface of the adjacent endwall, permitting the vane to slide radially into and out of the space 146 (FIGS. 4 and 5) in the adjacent inner endwall 103. The space 146 is underneath the vane footprint as depicted in FIGS. 4 and 5. Thus, as noted previously, the slip joints 206 in the turbine nozzle accommodate differential thermal expansion of the vanes relative to the endwalls. However, as noted previously, the hot combustion gas ingestion from the pressure side of the vanes, into the associated space, and onto the suction side of the vanes can result in aerodynamic performance degradation and oxidation damage to the vanes and adjacent endwall at the slip joints, causing material recession of the vanes and adjacent endwall. As the size of the gaps between the end portion of the vanes and adjacent endwall at the slip joint increases due to material recession, the amount of hot gas ingestion increases, resulting in still higher aerodynamic performance degradation and even more oxidation damage, continuing to cause even more recession, if the slip joints were not cooled according to exemplary embodiments of the present invention as described herein.

Referring now to FIG. 6, in accordance with exemplary embodiments of the present invention, the turbine nozzle 110 further comprises a plurality of endwall cooling holes 150 defined through endwall 103. The plurality of endwall cooling holes 150 are disposed adjacent the periphery of the slip joint 206, on the pressure side 122 of the vane 120. The endwall cooling holes 150 are formed in the endwall 103, along the pressure side of the vane and in proximity to the leading edge 126 of the vane. The plurality of endwall cooling holes are substantially aligned with the direction of hot gas combustion gas flow, but also are directed toward the pressure side of the vane 120. The plurality of endwall cooling holes in endwall 103 comprise a first set (encircled region A of FIG. 6) of endwall cooling holes along the pressure sidewall of the vane and a second set (encircled region B of FIG. 6) of endwall cooling holes in proximity to the leading edge 126 of the vane. Each cooling hole of the plurality of endwall cooling holes 150 has a cooling hole outlet 152 opening onto the endwall 103 in proximity to the slip joint 206. The endwall cooling holes 150 are selectively located such that the cooling medium 76 exiting therefrom mixes with the combustion gas 19 and follows the combustion gas flow path (indicated by arrows in FIG. 5) through the slip joint, as hereinafter described. More particularly, the endwall cooling holes are selectively located so that the cooling medium flow 76 (FIG. 1) ejected through the plurality of endwall cooling holes 150 mixes with the hot combustion gas ingestion flow 19 that flows through the slip joints, thereby reducing the temperature of the combustion gas 19 that is ingested through the slip joints 206 in the turbine nozzle. While the plurality of endwall cooling holes 150 are described as defined through inner endwall 103, it is to be understood that the plurality of endwall cooling holes 150 may alternatively be defined through outer endwall 105 when the slip joints in the turbine nozzle are between the outer endwall and the outer end portions of the vanes and the inner endwall is used as the mechanical anchor.

The plurality of endwall cooling holes may be generally cylindrical in cross-section. The endwall cooling holes may have other cross-sectional shapes. While a specific number of endwall cooling holes, cooling hole geometries, and cooling hole configurations are illustrated, it is to be understood that the exemplary embodiments as herein described are not limited to any particular number of endwall cooling holes, geometries and/or configurations. For example, the cooling hole shape, hole spacing between endwall cooling holes (center of one film cooling hole to the center of the sequential film cooling hole), or the like may be varied depending upon the particular application.

Still referring to FIG. 6, in accordance with exemplary embodiments of the present invention, the turbine nozzle further comprises a plurality of airfoil quenching holes 160 defined through the pressure sidewall in the inner end portion of the vane, in proximity to the slip joint and in proximity to the leading edge. The plurality of airfoil quenching holes cooperate with the plurality of endwall cooling holes to enhance slip joint and metal surface cooling relative to other cooling systems and methods. The cooling system comprises the plurality of airfoil quenching holes and the plurality of endwall cooling holes that cooperate with the plurality of airfoil quenching holes to improve slip joint cooling. The plurality of airfoil quenching holes receive cooling medium via the airfoil cooling circuit 115.

The plurality of endwall cooling holes receiving cooling medium via the endwall cooling circuit 117.

The plurality of airfoil quenching holes 160 may be formed through one of the vane end portions by methods known in the art, such as by electrode discharge machining (EDM). The airfoil quenching holes may be generally cylindrical in cross-section, inclined at the steepest possible angle with respect to the endwall surface as depicted in FIG. 4. The airfoil quenching holes have a strong radial compound angle and a variable lateral compound angle that grows from a minimum at the leading edge to a maximum at mid-chord. The airfoil quenching holes are directed toward the adjacent endwall and have a steep angle with respect to the hot combustion gas. The airfoil quenching holes each have an outlet 153 opening onto an outer surface of the end portion of the airfoil. The airfoil quenching holes need not cover the entire length of the slip joint along the pressure side, but only the portion that experiences a high blowing ratio (low gas path Mach number). The airfoil quenching holes may have cross-sectional shapes other than that depicted. While a specific number of airfoil quenching holes, quenching hole geometries, and quenching hole configurations are illustrated, it is to be understood that the exemplary embodiments as herein described are not limited to any particular number of airfoil quenching holes, geometries and/or configurations. For example, the quenching hole shape, hole spacing between airfoil quenching holes (center of one quenching hole to the center of the sequential quenching hole), or the like may be varied depending upon the particular application. The angle of the airfoil quenching holes and their relative position to the slip joint provides enhanced slip joint cooling. As noted previously, while the plurality of airfoil quenching cooling holes 160 are described as defined through inner end portion 138 of the vane, through the pressure sidewall near the leading edge, it is to be understood that the plurality of airfoil quenching holes 160 may alternatively be defined through the outer end portion 140 when the slip joints in the turbine nozzle are between the outer endwall and the outer end portions of the vanes and the inner endwall is used as the mechanical anchor.

Referring now to FIGS. 1 and 6, according to exemplary embodiments of the present invention, cooling the slip joint in the turbine nozzle begins by extracting a cooling medium from an exit of the compressor of the gas turbine engine (step 400). The amount extracted should be suitable in quantity to sufficiently cool the combustion gas flow through the slip joint. The quantity of cooling medium is determined by the maximum allowable vane and endwall metal surface temperatures below which oxidation damage is substantially prevented (in the absence of any oxidation protection coatings). The vane and endwall metal temperature levels proximate the slip joint are mainly governed by the heat input from the hot combustion gas ingested through the slip joint. A known high fidelity three-dimensional flow and a conjugate heat transfer analysis tool are used to predict the metal temperatures proximate the slip joint and the cooling medium quantity suitable to substantially ensure that the vane and endwall metal temperatures are maintained at temperature levels below which oxidation damage is substantially prevented. However, while the cooling medium may allow higher operating temperatures of the gas turbine engine and the turbine nozzle, the cooling medium may also be parasitic to the engine, as it is not directly used to produce power, e.g., thrust. Therefore, the amount of cooling medium directed to the slip joint should be optimized to an amount sufficient to cool the slip joint to substantially prevent oxidation damage without using more than necessary.

The cooling medium flow from the compressor is directed to the airfoil cooling circuit 115 and the endwall cooling circuit 117. More particularly, as noted previously, compressed air 23 may be extracted from the exit 21 of the compressor 16 and flows into the inner and outer diameter combustor plenums 40a and 40b. A portion (the cooling medium 76) of the compressed air flows from the combustor plenum 40a to the airfoil cooling circuit and from combustor plenum 40b to the endwall cooling circuit to the turbine nozzle 110 in the turbine section 100 (FIGS. 1 and 2). The endwall cooling circuit 117 receives the cooling medium from combustor plenum 40b. The cooling medium 76 flows through the plurality of openings 123a in impingement baffle 121a to impinge on an inside surface of endwall 103 and through the plurality of openings 123b in impingement baffle 121b to impinge on the inside surface of endwall 105 (FIGS. 2 and 6). After impingement, the cooling medium 76 is ejected from the cooling hole outlet 152 of each cooling hole of the plurality of endwall cooling holes 150 defined through the endwall. As noted previously, the illustrated cooling hole outlet 152 opens onto the endwall 103 (more particularly, the outer surface of endwall 103) in proximity to the slip joint 206. Also as noted previously, the endwall cooling holes are selectively located so that the cooling medium flow 76 ejected through the plurality of endwall cooling holes 150 mixes with the hot combustion gas ingestion flow 19 that subsequently flows through the slip joints, thereby reducing the temperature of the combustion gas ingested through the slip joints. As noted previously, while the plurality of endwall cooling holes 150 are described as defined through inner endwall 103, it is to be understood that the plurality of endwall cooling holes 150 may alternatively be defined through outer endwall 105 when the slip joints in the turbine nozzle are between the outer endwall and the outer end portions of the vanes and the inner endwall is used as the mechanical anchor.

The cooling medium from the combustor plenum enters the airfoil cooling 115 circuit through the impingement baffle 121b, internally cools the vane walls (pressure and suction sidewalls), and the cooling medium is finally ejected or discharged into the combustion gas path through the airfoil quenching holes 160 located adjacent to the slip joint proximate the airfoil leading edge and through the pressure sidewall. The airfoil quenching holes are directed toward the slip joint gap, and because of the short distance from the endwall surface, the airfoil quenching holes act both as impingement holes and film holes, as noted previously. As the Mach number increases along the combustion flow path, the cooling film from the endwall cooling holes 150 tends to stay more attached to the endwall, therefore providing sufficient cooling to the slip joint to substantially ensure that the vane and endwall metal temperatures are maintained at temperature levels below which oxidation damage is substantially prevented. To maximize the quenching, washing, and cooling effectiveness, the airfoil quenching holes are preferably of constant cross section (non-fanned). The airfoil quenching holes are also effective in reducing typical secondary flows, such as horseshoe vertexes that occur near the endwalls of a turbine nozzle. As known in the art, a horse-shoe vortex is formed on the endwall in the close vicinity of the intersection between the vane leading edge 126 and the endwall. The horse-shoe vortex tends to migrate from the pressure side of the vane toward the suction side of the vane along the endwall, causing the lift-off of the film cooling layer along the endwall. The cooling medium ejected from the outlets 153 of the airfoil quenching holes in proximity of the leading edge reduces the formation of the horse-shoe vortex due to the introduction of high momentum cooling jets into the approaching hot combustion gas flow and as such, mitigates the lift-off of the film layer of cooling medium along the endwall. The cooling medium exiting through the outlets of the airfoil quenching holes also has sufficient momentum to significantly improve quenching of the hot combustion gas before ingestion relative to other cooling methods.

The plurality of airfoil quenching holes and the plurality of endwall cooling holes thus are in fluid communication between the compressor and the combustion gas flow path of the gas turbine engine and the plurality of airfoil quenching and endwall cooling holes are selectively located to mix with the combustion gas flow and follow the combustion gas flow path through the slip joint. The mixture of cooling medium 76 and hot combustion gas 19 results in "diluted and cooled combustion gas" 190 (FIG. 5). Following the combustion gas flow path 106 (FIG. 5), the diluted and cooled combustion gas 190 passes through the open slip joint between the end portion of the vanes and the adjacent endwall in the turbine nozzle in the same manner as previously described for combustion gas 19. The diluted and cooled combustion gas 190 generates high heat transfer coefficient on the adjacent surfaces (due to a high Reynolds number) that cools (relative to turbine nozzles without slip joint cooling) both the end portion of the vanes and the adjacent endwall surfaces. The diluted and cooled combustion gas 190 film cools the slip joint 206 (including the endwall downstream of the ejection point). Slip joints between the outer endwall 105 and the outer end portions of the vanes are cooled in the same manner as slip joints between the inner endwall 103 and inner end portions of the vanes. Significant reductions in temperature at the slip joint and on the aft side of the endwall (i.e., the suction side) may also be realized relative to turbine nozzles without slip joint cooling, thereby substantially preventing oxidation damage at the slip joint. Substantial prevention of oxidation damage at the slip joints substantially insures the size of the gaps 142 and 144 does not increase over time, thereby minimizing aerodynamic performance degradation and minimizing combustion gas ingestion therethrough. In addition, an overall increase in cooling effectiveness of the turbine nozzle is realized.

From the foregoing, it is to be appreciated that the turbine nozzles and cooling systems for cooling slip joints therein are provided. Cooling of the slip joints in the turbine nozzles helps substantially prevent aerodynamic performance degradation and oxidation damage at the slip joint, thereby decreasing material recession and contributing to longer operative life of the turbine nozzles. Cooling film blow-off may also be reduced.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine nozzle comprising:
   an endwall;
   a vane coupled to the endwall, the vane comprising:
      a leading edge and a trailing edge interconnected by a pressure sidewall and a suction sidewall; and
      an end portion;
   a slip joint between the end portion and the endwall;
   a plurality of airfoil quenching holes defined through the pressure sidewall in the end portion cooperating with a plurality of endwall cooling holes defined through the endwall along the pressure sidewall and in proximity to the leading edge, the plurality of airfoil quenching holes and endwall cooling holes disposed adjacent the slip joint, each airfoil quenching hole has an outlet, each of the plurality of airfoil quenching holes having a lateral compound angle, and the lateral compound angle of the plurality of airfoil quenching holes increases from the leading edge to a mid-chord of the vane; and
   the plurality of endwall cooling holes that comprise a first set of endwall cooling holes extending along the pressure sidewall and a second set of endwall cooling holes disposed in proximity to the leading edge of the vane, the first set of endwall cooling holes spaced apart from the second set of endwall cooling holes by a portion of the endwall and the outlet of at least one of the plurality of airfoil quenching holes is directed towards the portion of the endwall.

2. The turbine nozzle of claim 1, wherein each endwall cooling hole has a cooling hole outlet, the outlet and the cooling hole outlet opening proximate to the slip joint.

3. The turbine nozzle of claim 1, wherein the plurality of endwall cooling holes and the plurality of airfoil quenching holes are in fluid communication between a compressor and a combustion gas flow path of a gas turbine engine.

4. The turbine nozzle of claim 3, wherein the plurality of airfoil quenching holes are selectively located through the pressure sidewall in the end portion and the plurality of endwall cooling holes are selectively located along the pressure sidewall and in proximity to the leading edge to mix with and follow the combustion gas flow path through the slip joint.

5. The turbine nozzle of claim 3, wherein the plurality of airfoil quenching holes receive a cooling medium from the compressor via an airfoil cooling circuit and the plurality of endwall cooling holes receive the cooling medium from the compressor via an endwall cooling circuit.

6. The turbine nozzle of claim 1, wherein the slip joint is disposed between the plurality of airfoil quenching holes and the plurality of endwall cooling holes and the plurality of airfoil quenching holes are directed toward the endwall at an angle.

7. A turbine nozzle for a gas turbine engine, the turbine nozzle comprising:
a pair of endwalls;
a plurality of vanes extending between the pair of endwalls, each vane of the plurality of vanes comprising:
a leading edge and a trailing edge interconnected by a pressure sidewall and a suction sidewall; and
an end portion and an opposing end portion;
a slip joint between the end portion and an adjacent endwall of the pair of endwalls and the opposing end portion anchored to the other endwall of the pair of endwalls;
a plurality of airfoil quenching holes defined through the pressure sidewall in the end portion in proximity to the leading edge cooperating with a plurality of endwall cooling holes defined through the adjacent endwall along the pressure sidewall and in proximity to the leading edge, each of the plurality of airfoil quenching holes has an outlet, the plurality of airfoil quenching holes and endwall cooling holes are disposed adjacent the slip joint, each of the plurality of airfoil quenching holes having a radial compound angle and a lateral compound angle, with the lateral compound angle of the plurality of airfoil quenching holes increasing from a minimum at the leading edge to a maximum at a mid-chord of the vane; and
the plurality of endwall cooling holes defined through the adjacent endwall that comprise a first set of endwall cooling holes extending along the pressure sidewall and a second set of endwall cooling holes disposed in proximity to the leading edge of the vane, the first set of endwall cooling holes spaced apart from the second set of endwall cooling holes by a portion of the endwall and the outlet of at least one of the plurality of airfoil quenching holes is directed towards the portion of the endwall.

8. The turbine nozzle of claim 7, wherein the vane is in an annular array of vanes extending between the pair of endwalls, the slip joint between the end portion of each vane in the annular array and the adjacent endwall.

9. The turbine nozzle of claim 7, wherein the outlet of the plurality of airfoil quenching holes opens onto an outer surface of the end portion and each cooling hole of the plurality of endwall cooling holes has a cooling hole outlet opening onto the adjacent endwall, the outlet and cooling hole outlet opening in proximity to the slip joint.

10. The turbine nozzle of claim 7, wherein the plurality of airfoil quenching holes and the plurality of endwall cooling holes are in fluid communication between a compressor and a combustion gas flow path of the gas turbine engine and the plurality of quenching and endwall cooling holes are selectively located to mix with a combustion gas flow and follow the combustion gas flow path through the slip joint.

11. The turbine nozzle of claim 7, wherein the plurality of airfoil quenching holes receive a cooling medium from a compressor of the gas turbine engine via an airfoil cooling circuit and the plurality of endwall cooling holes receive the cooling medium from the compressor via an endwall cooling circuit.

12. The turbine nozzle of claim 7, wherein the slip joint is disposed between the plurality of airfoil quenching holes and the plurality of endwall cooling holes and the plurality of airfoil quenching holes are directed toward the adjacent endwall at an angle.

13. A cooling system for cooling a slip joint in a turbine nozzle comprising a vane having an end portion coupled to an endwall by the slip joint, the cooling system comprising:
a plurality of airfoil quenching holes defined in the end portion of the vane in proximity to a leading edge of the vane, each of the plurality of airfoil quenching holes having an outlet and a lateral compound angle, and the lateral compound angle of the plurality of airfoil quenching holes increases from the leading edge to a mid-chord of the vane; and
a plurality of endwall cooling holes defined in the endwall, the plurality of endwall cooling holes cooperating with the plurality of airfoil quenching holes to cool the slip joint, the plurality of endwall cooling holes in the endwall comprise a first set of endwall cooling holes and a second set of endwall cooling holes, the first set of endwall cooling holes spaced apart from the second set of endwall cooling holes by a portion of the endwall, with the outlet of at least one of the plurality of airfoil quenching holes directed toward the portion of the endwall, and the plurality of airfoil quenching holes and endwall cooling holes are disposed adjacent the slip joint, on a pressure side of the vane.

14. The cooling system of claim 13, wherein a cooling medium is directed through the plurality of airfoil quenching holes and endwall cooling holes, each endwall cooling hole having a cooling hole outlet, and the outlet and cooling hole outlet exiting into a pressure side gap of the slip joint to mix with and follow a combustion gas flow path through the slip joint, the pressure side gap being adjacent the end portion of the vane.

15. The cooling system of claim 14, wherein the cooling medium is directed through the first set of endwall cooling holes that extend along the pressure sidewall and through the second set of endwall cooling holes disposed in proximity to the leading edge of the vane, each cooling hole of the plurality of endwall cooling holes having a cooling hole outlet opening onto the endwall in proximity to the slip joint.

16. The cooling system of claim 14, wherein the plurality of airfoil quenching holes and the plurality of endwall cooling holes are in fluid communication between a compressor and the combustion gas flow path of a gas turbine engine and the plurality of airfoil quenching holes and endwall cooling holes are selectively located to mix with a combustion gas flow and follow the combustion gas flow path through the slip joint.

17. The cooling system of claim 16, wherein the plurality of airfoil quenching holes receive the cooling medium from the compressor via an airfoil cooling circuit and the plurality of endwall cooling holes receive the cooling medium from the compressor via an endwall cooling circuit.

18. The cooling system of claim 14, wherein the slip joint is disposed between the plurality of airfoil quenching holes and the plurality of endwall cooling holes and the plurality of airfoil quenching holes are directed toward the endwall at an angle.

* * * * *